(12) United States Patent  (10) Patent No.: US 8,495,355 B2
Cross et al.  (45) Date of Patent: Jul. 23, 2013

(54) OPERATING SYSTEM EXPERIENCE STATES

(75) Inventors: David B. Cross, Redmond, WA (US);
Andrew T. Mason, Amity, OR (US);
Brendan T. Power, Seattle, WA (US);
Ian W. Robinson, Holly Springs, NC (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 13/036,006

(22) Filed: Feb. 28, 2011

(65) Prior Publication Data

US 2012/0221844 A1  Aug. 30, 2012

(51) Int. Cl.
*G06F 9/00* (2006.01)
*G06F 15/177* (2006.01)
*G06F 9/44* (2006.01)
*G06F 9/445* (2006.01)

(52) U.S. Cl.
USPC ............... 713/100; 713/1; 709/221; 717/168; 717/174

(58) Field of Classification Search
USPC ................ 713/1, 100; 709/221; 717/168, 174
See application file for complete search history.

(56) References Cited

U.S. PATENT DOCUMENTS

| | | | |
|---|---|---|---|
| 5,933,646 A * | 8/1999 | Hendrickson et al. | ........ 717/169 |
| 7,287,067 B2 | 10/2007 | Dharmarajan et al. | |
| 7,454,483 B2 | 11/2008 | Soluk et al. | |
| 7,793,284 B2 | 9/2010 | Mason et al. | |
| 7,971,047 B1 * | 6/2011 | Vlaovic et al. | .................... 713/1 |
| 8,230,394 B2 * | 7/2012 | Clemenceau et al. | ........ 717/121 |
| 2006/0168224 A1 | 7/2006 | Midgley | |

OTHER PUBLICATIONS

"Adding or removing BlackBerry Enterprise Server components", Retrieved at << http://docs.blackberry.com/en/admin/deliverables/16598/BlackBerry_Enterprise_Server_for_Microsoft_Exchange-Installation_and_Configuration_Guide--1091951-0615124404-001-5.0.2-US.pdf >>, Aug. 21, 2010, pp. 64-85.
"Lesson 3 Installing SQL Server 2005—p2", Retrieved at << http://www.programmersheaven.com/2/SQL-server-2005-school-lesson-3-p2 >>, Retrieved Date : Dec. 21, 2010, pp. 2.
"InformixIBM Informix Dynamic Server Installation Guide for Microsoft Windows", Retrieved at << http://www.oninit.com/manual/informix/1150/InstallationGuideForMicrosoftWindows.pdf >>, pp. 50. Copyright IBM Corp. 1996, 2007.
"Server Configuration Guide", Retrieved at << http://www.vmware.com/pdf/vi3_301_201_server_config.pdf >>, pp. 312, Jul. 6, 2008.

* cited by examiner

*Primary Examiner* — Stefan Stoynov (57) ABSTRACT

Aspects of the subject matter described herein relate to operating system experience states. Input may be received that requests a change from a current experience state to a target experience state. In response, state data may be obtained that indicates allowed experience states as well as component data that indicates components and relationships between components in the target experience state. This state data may then be used to change from the current experience state to a target experience state. The target experience state may be used, for example, to configure a server or other operating system.

20 Claims, 5 Drawing Sheets

OPERATING SYSTEM EXPERIENCE STATES

BACKGROUND

As servers become more capable, they are increasingly running more applications and processes. Running more applications and processes increases a server's attack surface to malicious attacks by others, generally increases servicing requirements, and places greater demands on the hardware to support the running programs, services, and applications. Servicing a server may involve patching and system reboots with their attendant resource consumption and downtime. Generally, any increased size, number, and so forth of server applications and processes increases support costs, risks, and potential service interruptions due to reboots.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to operating system experience states. Input may be received that requests a change from a current experience state to a target experience state. In response, state data may be obtained that indicates allowed experience states as well as component data that indicates components and relationships between components in the target experience state. This state data may then be used to change from the current experience state to a target experience state. The target experience state may be used, for example, to configure a server or other operating system.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth are used. The use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
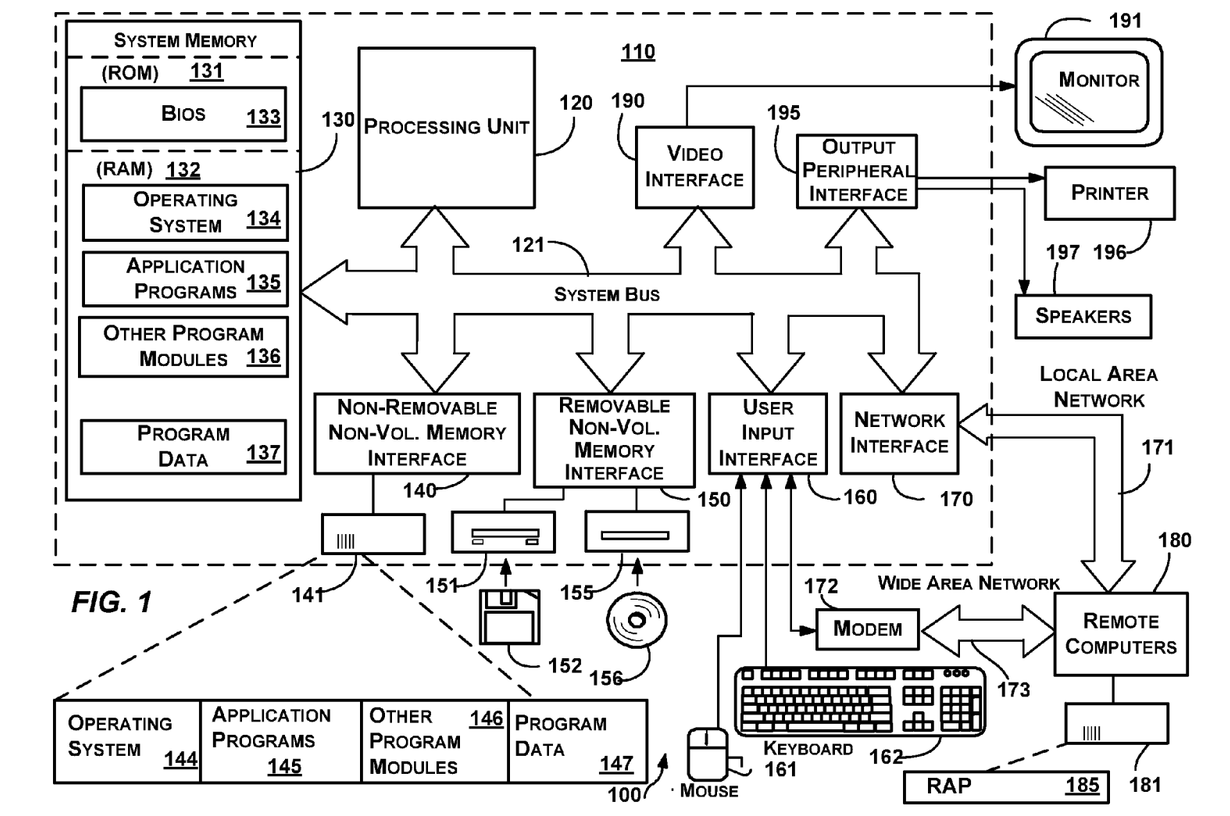
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, phones, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 remotely or through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device may be connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node or any other device similar to one that may implement the computer 110, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Experience States

Figure 2:
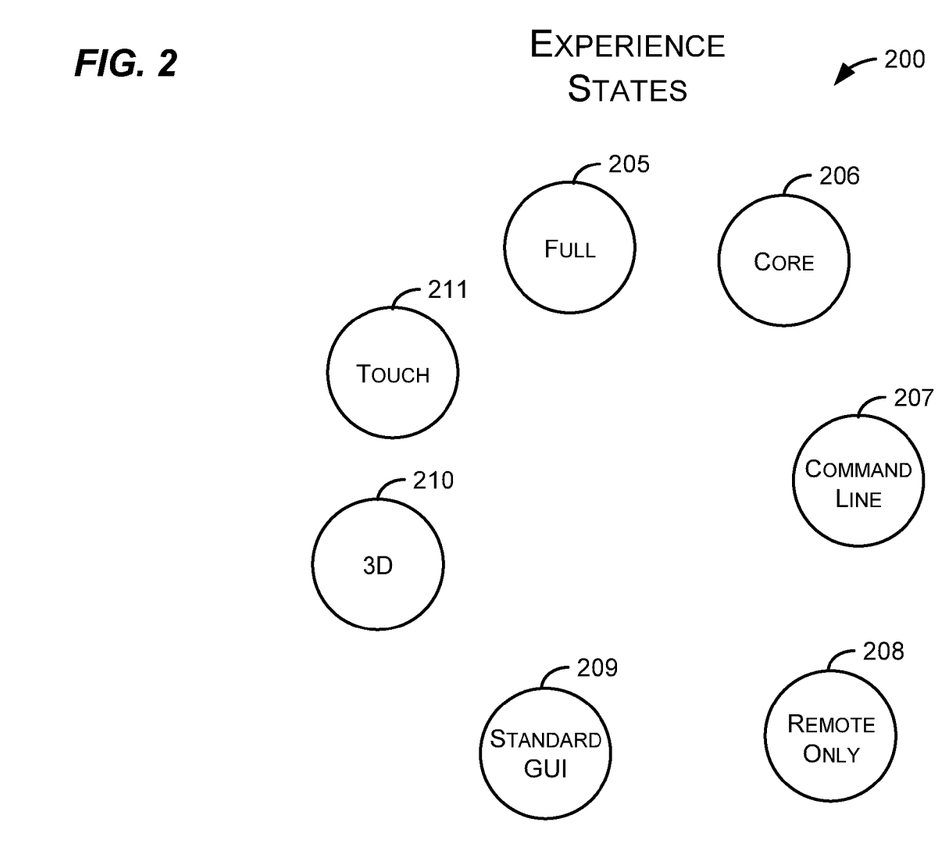
FIG. 2 is a block diagram that generally represents some exemplary experience states of an operating system in accordance with aspects of the subject matter described herein.

As mentioned previously, increasing the size, number, and so forth of server applications and processes may increase support costs, risks, and potential service interruptions due to reboots. FIG. 2 is a block diagram that generally represents some exemplary experience states of an operating system in accordance with aspects of the subject matter described herein.

The states 200 may include such states as a full experience state 205, a core experience state 206, a command-line experience state 207, a remote-only experience state 208, a standard graphical user interface (GUI) interface 209, a three dimensional (3D) experience state 210, a touch interface 211, a composite state that includes two or more of the above, and other experience states (not shown).

Each of the states 205-211 may be implemented with a set of components. As used herein, the term component is to be read to include hardware such as all or a portion of a device, a collection of one or more software modules or portions thereof, some combination of one or more software modules or portions thereof and one or more devices or portions thereof, and the like.

The core experience state 206 may correspond to a base set of components needed for an operating system to (minimally) function. The command line experience state 207 may correspond to a set of components needed to provide a command-line interface to an operating system without providing a comprehensive or complete GUI subsystem to interface with the operating system. The remote-only experience state 208 may correspond to a set of components that allow the operating system to interface with external systems while not having facilities such as a command line interface or a GUI interface to interface with the operating system. The standard GUI interface 209 may correspond to a set of components that allow a user to interface with the operating system via graphical elements such as dialog boxes, text boxes, list boxes, other graphical elements, and the like.

The 3D experience state 210 may correspond to a set of components that allow a 3D experience with the operating system. For example, the 3D experience state 210 may correspond to components that are able to receive human input via the use of cameras, motion sensors, sound, and the like.

The touch experience state 211 may correspond to a set of components that allow touch input. For example, the touch experience state 211 may correspond to a set of components that allow a user to touch a screen to provide input to an operating system.

The full experience 205 may correspond to an expanded set of components that allow interaction with an operating system. This expanded set of component may, for example, include many or all of the components indicated above for the other states.

Some other exemplary experience states include a file browser experience state that gives support for viewing files, an Internet browser experience state that allows accessing Web pages from the Internet or elsewhere, a task bar experience state that provides support for graphically launching programs, a help system experience state that provides help support, and the like.

The above experience states are not intended to be all-inclusive or exhaustive of experience state allowed with an operating system. Indeed, based on the teachings herein, those skilled in the art may recognize other experience states that may also be used without departing from the spirit or scope of aspects of the subject matter described herein.

Some of the components may depend on other components. For example, components in the 3D experience state 210 may depend on components that are found in the standard GUI experience state 209. The components in the experience states 205 and 207-211 may each depend, directly or indirectly on the components of the core experience state 206.

Furthermore, there may be multiple layers of dependencies. For example, components in the 3D experience state 210 may depend on components in the standard GUI experience state 209, which may depend on components in the core experience state 206. There may be more or fewer layers of dependencies. In addition, a component in one experience state may depend on components in two or more other experience states.

A first component may be said to depend on a second component if the first component is structured to use the second component for an operation of the first component. In other words, if the first component includes code or hardware that may call or otherwise use code or hardware of a second component, the first component is said to depend on the second component.

The experience states 205-211, a subset thereof, superset thereof, or other set of experience states may be designated as the "allowed" experience states of the operating system. Allowed experience states may mean experience states that are designated as tested and supported (e.g., by the operating system vendor). As another example, allowed experience state may mean experience states that are allowed based on keys purchased by the consumer. These examples are not all-inclusive or exhaustive.

The experience states 205-211 may be encoded in state data (e.g., a data structure) that indicates the allowed experience states. For each experience state, the state data may indicate the components of the operating system that are associated with the experience state. The state data may also include relationship data that indicates dependencies between components.

The state data may be obtained from one or more manifests. A manifest may include, refer to, or otherwise indicate binaries, dynamic link libraries (DLLs), other executable code, data and other resources, and the like. A manifest may include or refer to one or more other manifests on which the manifest depends. For example, where the manifest includes a first component that depends on a second component, the manifest may include an indication (e.g., reference, pointer, name, or the like) of the second component or an indication of another manifest that directly or indirectly indicates the second component.

The state data may be obtained from a file or other data structure that encodes allowed experience states and dependencies between components using a markup language. One popular markup language that may be used for this purpose is the Extensible Markup Language (XML), although other markup languages may also be used without departing from the spirit or scope of aspects of the subject matter described herein.

An operating system may include software that manages computer hardware resources. The term operating system as used herein may include any type of operating system or set of components that provide hardware resource management functionality. Some exemplary operating systems include server operating systems (such as those operating systems frequently used on servers), desktop operating system (such as those operating systems frequently installed on desktop and notebook computers, mobile operating systems (such as those often found on mobile devices such as cell phones, personal digital assistants, and other consumer devices), embedded operating systems (such as those embedded in firmware), and the like. An exemplary device that is suitable for executing an operating system includes the computer 110 of FIG. 1.

Certain experience states may be time restricted. For example, to reduce attack surface, servicing needs, or for other reasons, an experience state may be associated with a policy that indicates a length of time the operating system is allowed to be in the experience state. For example, a GUI experience state may be used to configure a server. After the server has been configured, the operating system may be set to a more limited experience state. To enforce this change, a policy may be set on the length of time the operating system is allowed to be in the GUI experience state. After the time expires, the experience state may be automatically changed by an enforcement component.

Figure 3:
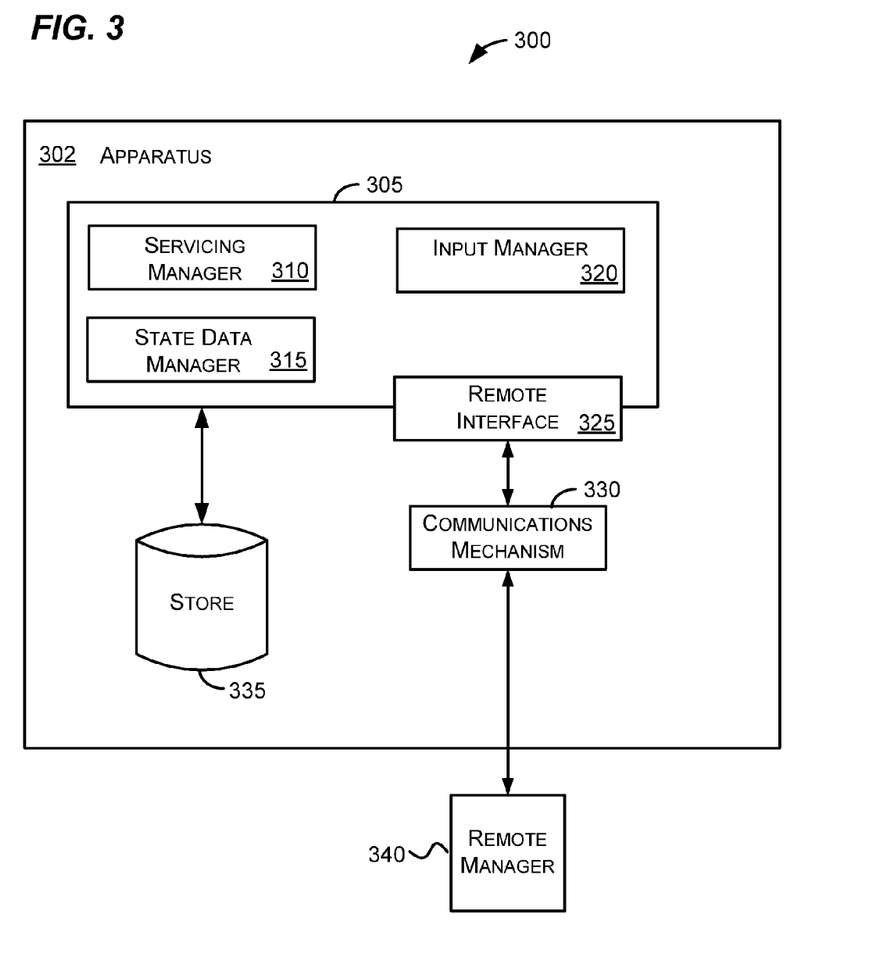
FIG. 3 is a block diagram that represents a system configured in accordance with aspects of the subject matter described herein.

FIG. 3 is a block diagram that represents a system configured in accordance with aspects of the subject matter described herein. The components illustrated in FIG. 3 are exemplary and are not meant to be all-inclusive of components that may be needed or included. In other embodiments, the components described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the system 300 may include an apparatus 302 and a remote manager 340. The apparatus 302 may include experience components 305, a communications mechanism 330, a store 335, and other components (not shown). The experience components 305 may include a servicing manager 310, a state data manager 315, an input manager 320, a remote interface 325, and other components (not shown).

The apparatus 302 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, phones, other mobile devices, distributed computing environments that include any of the above systems or devices, and the like. An exemplary device that may be configured to act as the apparatus 305 comprises the computer 110 of FIG. 1.

The apparatus 302 may include local input/output devices such as a mouse, keyboard, display, and the like, may be "headless" in that it does not include a mouse, keyboard, or display, or may be configured with other input/output devices.

The apparatus 302 may comprise a virtual environment. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, DVD, or other virtual media, may communicate via a virtual network adapter, and so forth.

The communications mechanism 330 allows the apparatus 302 to communicate with other entities. For example, the communications mechanism 330 may allow the apparatus 302 to communicate with a remote manager such as the remote manager 340. The communications mechanism 330 may be a network interface or adapter 170, modem 172, USB or other port, or any other mechanism for establishing communications as described in conjunction with FIG. 1.

The store 335 is any storage media capable of providing access to data including, for example, state data and policies. The store 335 may be implemented with a file system, database, volatile memory such as RAM, other storage, some combination of the above, and the like and may be distributed across multiple devices. The store 335 may be external, internal, or include components that are both internal and external to the apparatus 302.

As indicated previously, the state date may indicate components of the operating system that are associated with each of the allowed experience states together with relationship data that indicates dependencies between components. In some implementations, the state data may indicate experience states that are designated as tested and supported.

The state data manager 315 may be used to access the state data on the store 335. In one embodiment, the state data manager 315 may comprise a database management system (DBMS) that may be used to access state data. In another embodiment, the state data manger 315 may comprise a file system driver or other operating system component operable to access the state data.

The input manager 320 may be operable to receive an indication of a desired experience state change for an operating system. For example, the input manager 320 may receive user input interface that indicates a desired experience state change via a user interface. Such a user interface may display the allowed experience states and allow the user to select a desired experience state. This indication may be received by the input manager 320.

The servicing manager 310 may perform various actions regarding changing experience states. For example, the servicing manager 310 may obtain association data to determine a target experience state corresponding to an experience state change requested by the input. For example, a user may want to configure a server operating system using a user friendly graphical interface. To do this, the user may select an option that is labeled, for example, "simple interface". In response, the servicing manager 310 may determine (e.g., though the use of an association data structure such as a table) that the experience state associated with "simple interface" is the full experience state.

Other exemplary options may be labeled such as, for example, command line configuration, remote configuration, touch configuration, 3D configuration, standard configuration, and the like.

After obtaining the association data and determining the target experience state, the servicing manager 310 may change the experience state of the operating system from the current experience state to the target experience state. In doing this, the servicing manager may use, for example, the relationship data of the state data to determine components that are in the target experience state. Components that are in the target experience state may be installed, configured, transitioned, or otherwise activated on the operating system while components that are not in the target experience state may be uninstalled, re-configured, or otherwise deactivated on the operating system.

The servicing manager 310 may also enforce time-restriction policies with regard to a target experience state. For example, if a policy indicates a time period for which the operating system may be in the target experience state, the servicing manager 310 may automatically change from the target experience state after the period elapses.

The servicing manager 310 may operate to activate a subsystem (e.g., a command line subsystem, a graphical subsystem, or other interface subsystem) in preparation for receiving an indication of an experience state change. For example, upon indication that a user wants to make operating system configuration changes, the servicing manager 310 may activate a graphical subsystem (e.g., one or more components that support a graphical user interface), so that the user may indicate a desired experience state change. The servicing manager 310 may also operate to deactivate the subsystem without uninstalling or overwriting the entire operating system after successfully changing the operating system to the target experience state. The subsystem so activated may be a complete graphical user interface, a restricted graphical user interface that has sufficient functionality to receive the input for the desired experience state change, or some other subsystem.

The remote interface 325 may provide an interface by which experience state changes may be initiated remotely (e.g., by the remote manager 340). The remote interface 325 may allow the remote manager 340 to instruct the servicing manager 310 to change to a target experience state.

The remote manager 340 may comprise one or more components that are capable of communicating with one or more of the experience components 305 via the remote interface 325. For example, the remote manager 340 may comprise an Internet browser configured with appropriate software and/or settings that allow the browser to view the current experience state and request another experience state of the apparatus 302. As another example, the remote manager 340 may comprise proprietary management software that is capable of communicating with one or more of the experience components 305 via the remote interface 325 to request experience state changes. The remote manager 340 may also include one or more components for interacting with the operating system once the operating system is in the target experience state.

Figure 4:
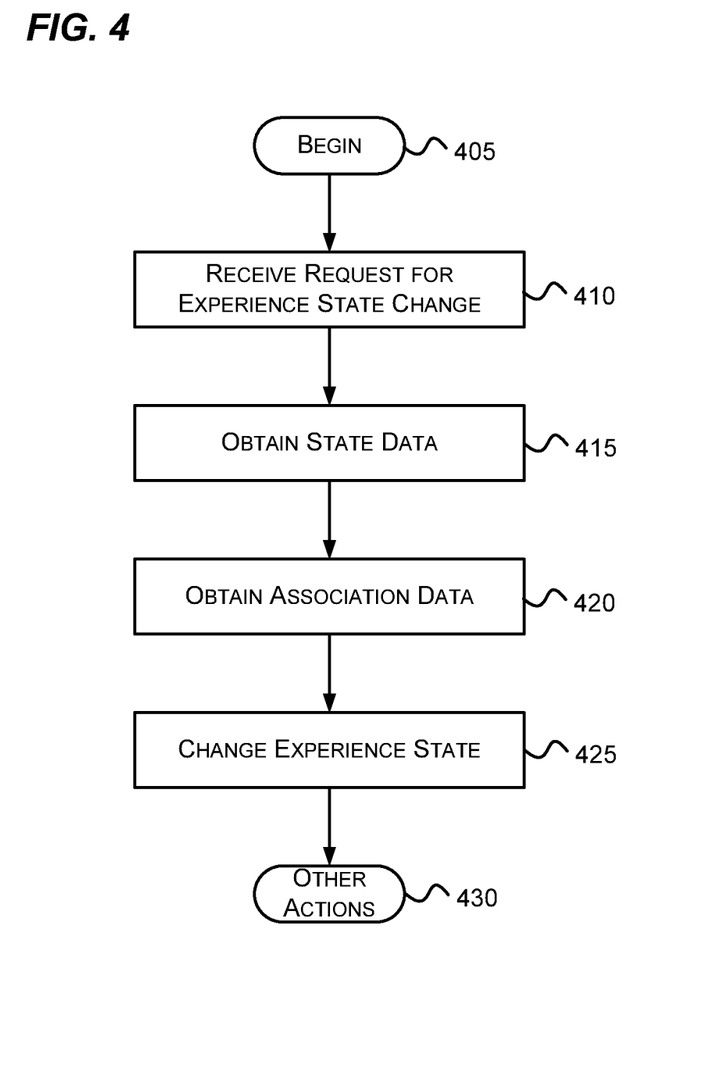
FIGS. 4-5 are flow diagrams that generally represent exemplary actions that may occur in accordance with aspects of the subject matter described herein.
Figure 5:
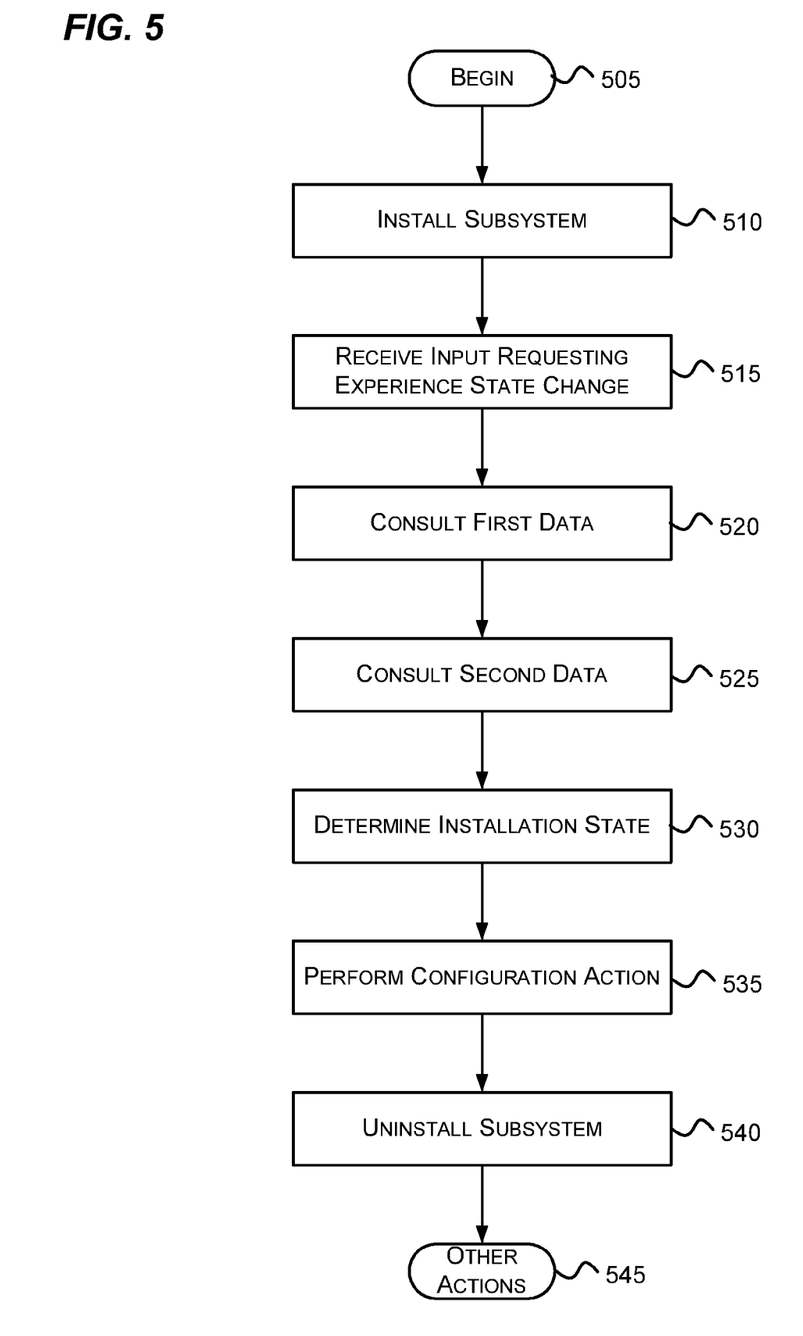

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, input is received that requests an experience state change. When the request is received, the operating system may be in a current experience state. For example, referring to FIG. 3, the input manager 320 may receive input from a user interface, remote interface, file, data structure, message, or the like that indicates a request for an experience state change. For example, the input manager 320 may receive a "simple interface" request.

At block 415, state data is obtained that indicates allowed experience states of the operating system. As mentioned previously, the state data may indicate components of the operating system associated with each of the allowed experience states together with relationship data that indicates dependencies between components. For example, referring to FIG. 3, the state data manager may obtain state data from the store 335.

In obtaining the state data, the state data manager 315 may obtain state data corresponding to the target experience state such as one of: full experience, core experience, 3D experience, touch experience, graphical user interface experience, command line interface experience, and remote-only experience.

At block 420, association data may be obtained to determine a target experience state corresponding to the experience state change. For example, referring to FIG. 3, the servicing manager 310 may use code (e.g., a switch statement or the like), table, or other data structure that associates input requests with experience states to determine a target experience state.

At block 425, the experience state is changed. For example, referring to FIG. 3, the servicing manager 310 may use relationship data to determine components that are in the target experience state and may have the components installed, activated, or otherwise configured so that the operating system changes to the target experience state.

Changing experience states may change from a more limited experience state to a more expanded experience state or vice versa. For example, the experience state may be changed from a command line only experience state to a standard GUI interface, 3D interface, touch interface, or full interface or vice versa. When changing from an expanded experience state to a limited experience state, the set of applications supported by the operating system may be a subset of the set of applications supported by the expanded experience state.

At block 430, other actions, if any, may be performed. For example, a policy may be obtained that indicates a length of time the operating system is allowed to be in the target experience state. This policy may then be enforced as appropriate.

Turning to FIG. 5, at block 505, the actions begin. At block 510, a subsystem is installed that supports a graphical interface. Here and in the claims, the word "installed" may mean activated, configured to execute, incorporated into or otherwise configured to work with the operating system, or the like. The subsystem is installed temporarily for the purpose of configuring the operating system. The subsystem may include a configuration tool (e.g., one or more components) that uses the graphical interface to receive experience state change requests for the operating system. For example, referring to FIG. 3, the servicing manager 310 may install a subsystem that supports a graphical user interface.

At block 515, input is received that requests an experience state change of the operating system. This input may be received via the graphical interface. For example, referring to FIG. 3, the input manager may receive an experience state change via the subsystem previously installed.

At block 520, first data is consulted (e.g., obtained, searched, accessed, or the like) to determine a first component corresponding to the experience state change. This first component may be one of a plurality of components used to implement the experience state corresponding to the experience state change. The first component may be a higher level component that depends on a plurality of other components to be installed on the computer to operate completely. For example, referring to FIG. 3, the servicing manager 310 may consult a manifest (e.g., an XML file) from the store 335 to find a top level component corresponding to the experience state change.

At block 525, second data may be consulted to determine a second component upon which the first component depends. For example, referring to FIG. 3, the servicing manager 310 may consult the manifest mentioned previously or other manifests referred to by the manifest or dependent manifests (at any level) to determine the second component (e.g., a lower level component upon which the first component depends). In one embodiment, manifests at each level may be consulted recursively to determine components upon which the first component depends.

At block 530, an installation state may be determined for the second component. An installation state may include, for example, whether the second component is currently installed and in use, whether the second component is present or staged on the computer but not installed or in use, whether the second component is deleted from or not present on the computer, or the like. Referring to FIG. 3, the servicing manager 310 may determine the installation state of the second component by examining data structures (e.g., such as a database, registry, or the like) that indicates installation state.

At block 535, a configuration action is performed based on the installation state. For example, referring to FIG. 3, if the second component is not installed or present on the apparatus 302, the servicing manager 310 may download the second component from a remote source and may install and configure the second component for use in the operating system. A configuration action may include uninstalling from the operating system each installed component depended on by the first component that is not depended on by another component that is not being uninstalled as a result of the experience state change At block 540, after performing the configuration action, the subsystem may be uninstalled or removed from the operating system based on a policy. For example, referring to FIG. 3, the servicing manager 310 may enforce a policy to revert to a previous experience state after a configuration action has been performed.

At block 545, other actions, if any may be performed. Some additional actions may include, for example:

1. Obtaining, from a data structure, a set of allowed experience states of the operating system;

2. Verifying that the experience state change, if performed, places the operating system in one of the allowed experience states; and 3. Based on the verifying, providing an indication of allowability of the experience state change (e.g., via a user interface).

Some other additional actions may include, for example, installing a minimal subset of components in the operating system for the first component to operate completely where the minimal subset is defined as only those components upon which the first component depends directly or indirectly. Determining the minimal subset may include searching a configuration data structure (e.g., one or more manifests) to determine the minimal subset for the first component to operate completely.

The additional actions described above are not intended to be all-inclusive or exhaustive. Indeed, based on the teachings herein, those skilled in the art may recognize other actions may be performed without departing from the spirit or scope of aspects of the subject matter described herein.

As can be seen from the foregoing detailed description, aspects have been described related to experience states. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving input that requests an experience state change of an operating system currently in a first experience state;

obtaining state data that indicates allowed experience states of the operating system, the state data indicating components of the operating system associated with each of the allowed experience states together with relationship data that indicates dependencies between components, where a first component is dependent on a second component if the first component is structured to use the second component for an operation of the first component;

obtaining association data to determine a target experience state corresponding to the experience state change requested by the input, the target experience state being one of the allowed experience states of the operating system; and changing the experience state of the operating system from the first experience state to the target experience state using the relationship data to determine components that are in the target experience state.

2. The method of claim 1, wherein obtaining state data that indicates allowed experience states of the operating system comprises obtaining the state data from a manifest associated with the first component, the manifest including at least an indication of the second component or an indication of another manifest that directly or indirectly indicates the second component.

3. The method of claim 1, wherein obtaining state data that indicates allowed experience states of the operating system comprises obtaining the state data in a file that encodes the allowed experience states and the dependencies between components using a markup language.

4. The method of claim 1, wherein changing the experience state of the operating system from the first experience state to the target experience state comprises changing from an experience state in which the operating system has a graphical user interface and support to execute an expanded set of applications to an experience state in which the operating system has a command line interface and support to execute a limited set of applications that is a subset of the expanded set of applications.

5. The method of claim 1, wherein receiving input that requests an experience state change of an operating system currently configured in a first experience state comprises receiving input that requests an experience state change for a server operating system, a desktop operating system, a mobile operating system, an embedded operating system, or another operating system.

6. The method of claim 1, wherein receiving input that requests an experience state change of an operating system currently configured in a first experience state comprises receiving input from a touch interface, a three dimensional interface, graphical user interface, a command line interface, a programming interface, or a file that includes the input.

7. The method of claim 1, wherein obtaining state data that indicates allowed experience states of the operating system comprises obtaining state data that indicates experience states that are designated as tested and supported.

8. The method of claim 1, wherein obtaining state data that indicates allowed experience states of the operating system comprises obtaining state data that indicates a state that includes only one of: full experience, core experience, 3D experience, touch experience, graphical user interface experience, command line interface experience, and remote-only experience.

9. The method of claim 1, further comprising obtaining a policy that indicates a length of time the operating system is allowed to be in the target experience state.

10. A computer storage memory having computer-executable instructions, which when executed perform actions, comprising:
    installing, temporarily and for configuring an operating system, a subsystem that supports a graphical interface, the subsystem including a configuration tool that uses the graphical interface to receive experience state change requests for the operating system;
    receiving, via the graphical interface, input that requests an experience state change of the operating system;
    consulting first data to determine a first component corresponding to the experience state change, the first component potentially depending on a plurality of other components to be installed on the computer to operate completely;
    consulting second data to determine a second component upon which the first component depends;
    determining an installation state of the second component with regard to the computer;
    based on the installation state, performing a configuration action with respect to the second component; and
    after performing the configuration action, uninstalling the subsystem from the operating system based on a policy.

11. The computer storage memory of claim 10, further comprising:
    obtaining, from a data structure, a set of allowed experience states of the operating system;
    verifying that the experience state change, if performed, places the operating system in one of the allowed experience states; and
    based on the verifying, providing an indication of allowability of the experience state change.

12. The computer storage memory of claim 10, wherein performing a configuration action comprises installing a minimal subset of components in the operating system for the first component to operate completely, the minimal subset defined as only those components upon which the first component depends directly or indirectly.

13. The computer storage memory of claim 12, further comprising searching a configuration data structure to determine the minimal subset for the first component to operate completely.

14. The computer storage memory of claim 10, wherein performing the configuration action comprises uninstalling from the operating system each installed component depended on by the first component that is not depended on by another component that is not being uninstalled as a result of the experience state change.

15. In a computing environment, a system, comprising:
    a data store operable to provide access to state data that indicates allowed experience states of an operating system, the state data indicating components of the operating system associated with each of the allowed experience states together with relationship data that indicates dependencies between components, where a first component is dependent on a second component if the first component is structured to use the second component for an operation of the first component;
    an input manager operable to receive an indication of an experience state change for the operating system; and
    a servicing manager operable to perform actions in response to the indication, including:
        obtaining association data to determine a target experience state corresponding to the experience state change requested by the indication, the target experience state being one of the allowed experience states of the operating system, and
        changing the experience state of the operating system from the first experience state to the target experience state using the relationship data to determine components that are in the target experience state.

16. The system of claim 15, wherein the data store is further operable to store a policy that indicates a length of time that the operating system is allowed to remain in an allowed experience state.

17. The system of claim 16, wherein the servicing manager is further operable to enforce the policy.

18. The system of claim 15, wherein the servicing manager is further operable to install a subsystem of the operating system in preparation for receiving the indication, the subsystem supporting a graphical interface operable to receive the indication of an experience state change.

19. The system of claim 18, wherein the servicing manager is further operable to uninstall the subsystem without uninstalling or overwriting the entire operating system, the servicing manager being operable to uninstall the subsystem after successfully changing the operating system to the target experience state.

20. The system of claim 15, wherein the data store being operable to provide access to state data that indicates allowed experience states of an operating system comprises the data store being operable to provide access to state data that indicates experience states that are designated as tested and supported.

* * * * *